Jan. 1, 1935.  H. C. POLLITZ  1,986,285
JOURNAL BEARING SEAL
Filed Dec. 8, 1933   2 Sheets-Sheet 2
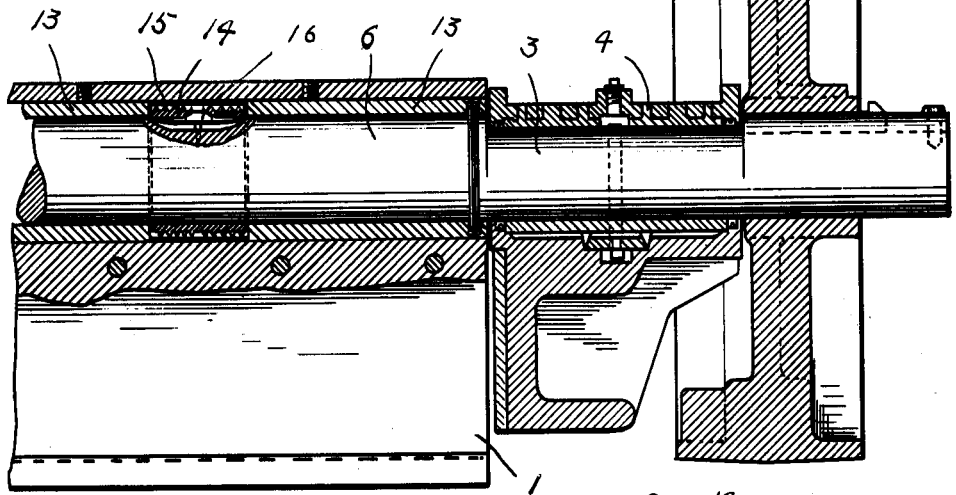
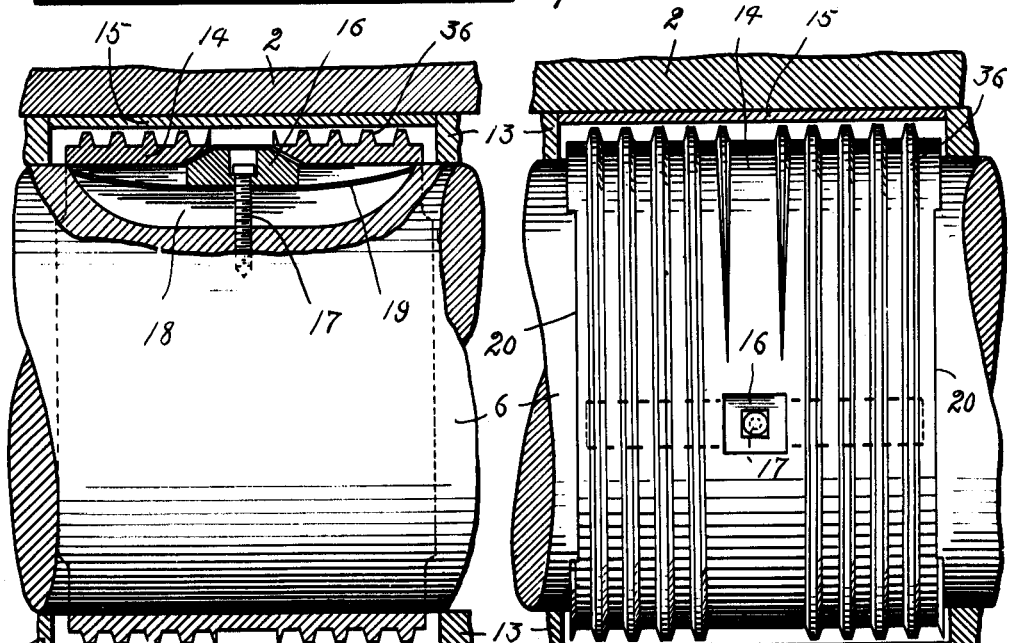

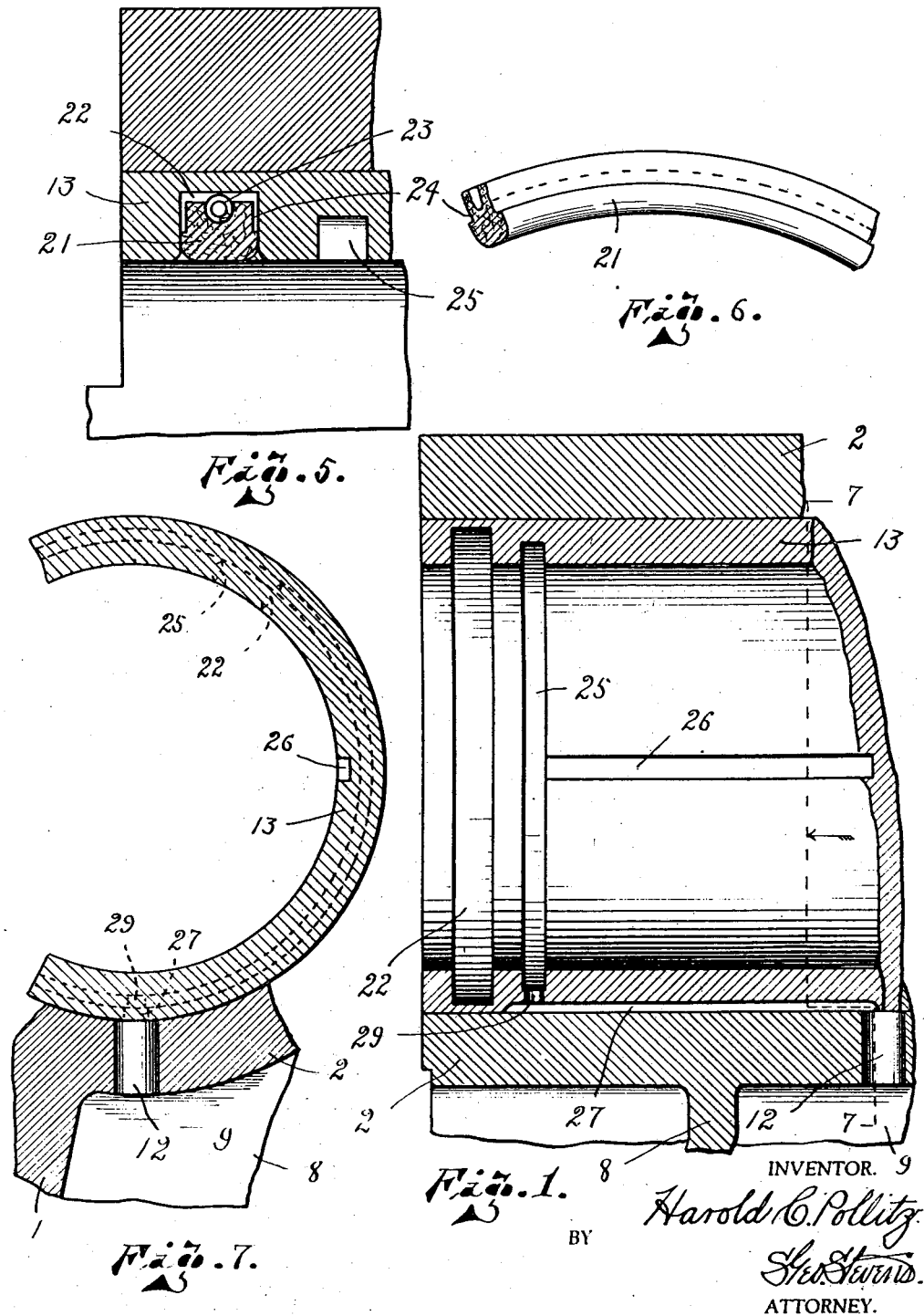

Patented Jan. 1, 1935

1,986,285

UNITED STATES PATENT OFFICE 1,986,285

JOURNAL BEARING SEAL

Harold C. Pollitz, Cedar Rapids, Iowa, assignor to Iowa Manufacturing Co., Cedar Rapids, Iowa Application December 8, 1933, Serial No. 701,492

9 Claims. (Cl. 286—5)

This invention relates to lubricating devices, and the embodiment of the invention herein illustrated pertains to such a device especially adapted for use in lubricating the pitman of what is known as high speed crushers.

The principal object is to produce an oiling system for such a device which assures maximum efficiency.

Another object is to insure against waste of oil in such a system.

Still other objects and advantages of the invention will appear in the following description thereof.

Referring now to the accompanying drawings, forming part of this application, and wherein like reference characters indicate like parts:

Figure 1 is a vertical section through the outer end of one of the bushings and portion of the pitman.

Figure 2 is a somewhat reduced section of one side of the pitman and one of the side bearings therefor, taken at right angles to Figure 1.

Figure 3 is an enlarged vertical section, longitudinally of the pitman, showing the latter in broken elevation, and the pump mounted thereon in section.

Figure 4 is a similar view to Figure 3 except that the pump is shown in elevation.

Figure 5 is an enlarged section of the upper portion of one side of the pitman and bushing therefor showing an improved sealing ring in section.

Figure 6 is a side elevation of a portion of the sealing ring.

Figure 7 is a section on the line 7—7, Fig. 8.

In the drawings, 1 represents the pitman of a high speed crusher, the journal or hub portion of which is illustrated at 2, it being carried upon the power transmitting shaft 3, which latter has journals or bearings 4 at either end thereof, and outwardly of which is mounted and keyed to the shaft the driving pulley 5. An eccentric enlargement of the shaft 3 is formed centrally thereof, as at 6, and upon which is journalled the pitman, it being freely rotatable within the hub portion 2 thereof.

The problem which the instant invention is designed to solve is that of efficiently lubricating this eccentric journal of the pitman, for, as is obvious, when the power shaft of the crusher is rotating, the pitman is given the desired oscillatory motion which causes the crusher to efficiently function as such.

The pitman journal bearing for the eccentric portion of the shaft is divided into two journals accomplished by installing within the pitman about the eccentric portion of the shaft two spaced bushings which are of suitable material such as bronze or the like, they being illustrated at 13, and are held stationary within the pitman hub. These bushings are spaced apart a suitable distance, approximately one-half the length of one of them, for the installation of what will be termed the pump worm or screw 14, installed about the shaft. A spacer ring or sleeve 15 is also fixed within the pitman hub intermediate of the spaced ends of the bushings and surrounds the pump worm to insure the proper spacing for the worm to operate without friction against either the bushings or the spacer.

The pump worm is of a single annular unit having helical protruding threads or teeth 36 extending therefrom. The threaded or toothed portions are spaced apart and oppositely pitched so as to force oil as it is received intermediate of same equally in both directions therefrom longitudinally of the shaft as the latter revolves in the proper direction to accomplish the same. The pump worm is fixed in relation to the shaft by means of a key nut illustrated at 16 and carried under the head of the bolt 17 mounted centrally in a longitudinally disposed well 18 formed in the upper circumferential face of the eccentric of the shaft 3 upon which the pitman is carried. This key nut is held upwardly against the head of the bolt 17 by means of the leaf spring 19, the ends of which bear against the arcuate ends 18 and is biased upwardly against the nut. The nut is elongated and provided with tapered ends so that the central portion thereof may extend upwardly into a similarly shaped recess formed in the pump worm, thus insuring that the worm at all times travels with the shaft when the key nut is in its normal position as illustrated. This construction, however, provides for convenient removal of the pump worm when desired and when the pitman is in unassembled position in respect to the crusher by simply depressing the nut from the exterior of the worm until the latter may be slid longitudinally of the shaft and the whole assembly separated. It will be noted that a portion of the opposite sides of each end of the pump worm as at 20 is cut away, or stepped, thus forming a sort of expansion chamber for the oil as it is forced against the ends of the bushings at either end of the worm, so that the worm and shaft during the revolution thereof carries an augmented volume of the lubricant at the point where the same is being forced into the bearing surface.

Thus providing means for feeding and forcing of oil to the two opposite sides of the journal necessitated exceptionally efficient means for preventing the leakage or waste of oil at the outer ends of such bearings, and to provide against which there is installed adjacent the outermost end of each bushing a floating sealing ring 21. A substantially square annular groove or recess, indicated at 22, is formed for the reception of the sealing ring 21, the latter being of leather, or other suitable material, and provided with an annular outer circumferential semi-circularly shaped groove for the reception of the contractile helical garter spring indicated at 23. This spring is for the purpose of causing the ring to normally hug the shaft uniformly throughout and freely float within the groove or recess in the bushing in which it is thus confined. An additional requisite of such construction, and to avoid abnormal heating, is that of stepping or cutting away a portion of both sides of the sealing ring as at 24 so that but a relatively small area upon either side is pressed against the opposite side walls of the channel. In other words the ring 21 is so constructed as to relieve the side walls thereof of the stress caused by the garter spring surrounding same.

This construction of ring has proven adequate for the purpose but only after extensive experimentation by which such novel form was developed, and which forms one of the essential features of the invention.

Just inwardly of each ring seal is formed an annular oil groove 25 within the bushings, which are continuous and communicate with two horizontal oil grooves 26 and 27, the former being upon the inner surface of the bushing and extending the full length thereof while the latter is formed upon the outer surface of the bushing and extends only a portion of the length thereof to a point communicating with its respective drain or discharge hole 12 through the lower wall of the pitman and into the lower portion of the oil reservoir, there being a single hole 29 for communication between the grooves 27 and 25, which affords an ample supply of oil wholly about the shaft in close proximity to the sealing ring by means of the annular groove 25 which is in direct communication through the groove 26 with the source of supply of the lubricant, as well as being in direct communication with the discharge opening or port into the lower part of the reservoir; and the groove 26 extending the full length of the bushing insures a positive supply of oil to every portion of the shaft intermediate the two ends of the bushing.

It will be noted that since the shaft of the crusher is a revolving shaft and has a clearance varying from approximately ¹⁄₃₂" to perhaps as much as ⅛", the seal must be a "floating" seal; the floating action being caused by the eccentric contacting the bushing once over its entire surface during each revolution, and the seal must follow the shaft and make the eccentric motion caused by the clearance of the shaft in the journal.

Having thus described my invention, what I claim and desire to secure by Letters Patent, is:

1. An oil sealing ring of fibrous material, substantially U-shaped in cross section and having a portion of either side stepped or cut-away.

2. An oil retaining device adapted to seal the lubricated surfaces of two eccentrically mounted relatively movable members, comprising a sealing ring having a circumferential, longitudinally disposed straight sided channel thereabouts, each side of said ring being stepped or cut-away, and a garter spring within said channel.

3. An oil retaining device adapted to seal the lubricated surfaces of two eccentrically mounted relatively movable members, comprising a floating sealing ring having a circumferential longitudinally disposed straight-sided channel thereabouts, a garter spring within said channel, and the outermost portion of the sides of said ring being cut-away for a distance materially below said spring to prevent lateral force of said spring causing the sides to frictionally engage an adjacent surface.

4. Oil retaining means for the lubricated surface of an eccentrically mounted rotatable shaft, comprising a resilient sealing ring substantially U-shaped in cross-section, characterized by being stepped or cut-away upon opposite outermost portions of its sides to reduce the frictional areas of said side portions of the ring, the cross-sectional area of the remainder of said ring being substantially semi-circular in form.

5. An oil sealing ring for a rotatable shaft and bearing comprising in combination an annular rectangular groove within said bearing about the shaft, a resilient sealing ring fitting snugly within said groove, the opposite sides of the outermost portions of said ring being reduced in thickness for reduction of its frictional contact with the side walls of the groove, and a contractile garter spring disposed about said ring.

6. An oil seal for the lubricated surfaces of two eccentrically mounted relatively movable members, comprising an annular rectangular groove within the outermost one of said members, a resilient sealing ring fitting snugly within said groove, and having an annular channel thereabouts, the outermost portion of said ring having stepped side walls cut-away for a distance materially below said channel for reduction of its frictional contact with the side walls of the groove, and an annular spring cooperatively associated with said ring.

7. An oil sealing ring having a straight-sided circumferential groove thereabouts, the sides of the outermost portion of said ring being cut-away to a distance materially greater than that of the groove, and the remaining portion of the ring being in cross-section substantially arcuate in form.

8. A packing ring for a rotatable shaft said ring having a straight-sided circumferential groove thereabouts, the sides of the outermost portion of said ring being cut-away to a depth materially greater than that of said groove and the remaining portion being convex for engagement with the shaft.

9. A packing ring for a rotatable shaft, said ring having approximately the outermost half of the opposite sides of said ring cut-away, the remaining half being in cross-section substantially semi-circular in form, and a contractile spring surrounding said ring.

HAROLD C. POLLITZ.